United States Patent [19]

Nederlof

[11] Patent Number: 5,590,118
[45] Date of Patent: Dec. 31, 1996

[54] METHOD FOR REROUTING A DATA STREAM

[75] Inventor: Leo Nederlof, Antwerp, Belgium

[73] Assignee: Alcatel N.V., Rijswijk, Netherlands

[21] Appl. No.: 518,268

[22] Filed: Aug. 23, 1995

[30] Foreign Application Priority Data

Aug. 23, 1994 [EP] European Pat. Off. .............. 94202415
Aug. 3, 1995 [EP] European Pat. Off. .............. 95202121

[51] Int. Cl.⁶ .......................... H04L 12/24; G06F 11/20
[52] U.S. Cl. ...................................... 370/218; 395/182.02
[58] Field of Search ......................... 370/16, 16.1, 94.1, 370/60, 54; 379/221, 273; 395/182.02; 340/825.01, 827

[56] References Cited

U.S. PATENT DOCUMENTS

| | | | |
|---|---|---|---|
| 4,999,829 | 3/1991 | Fite, Jr. et al. | 370/16 |
| 5,065,399 | 11/1991 | Hasegawa | 395/182.02 |
| 5,235,599 | 8/1993 | Nishimura et al. | 371/11.2 |
| 5,435,003 | 7/1995 | Chng | 395/575 |
| 5,513,345 | 4/1996 | Sato | 395/182.02 |

FOREIGN PATENT DOCUMENTS 0436201 7/1991 European Pat. Off. ..
0538853 4/1993 European Pat. Off. ..

OTHER PUBLICATIONS

Conference Record, IEEE Global Telecommunicaitons Conference, 2–5 Dec. 1990, vol. 1 pp. 459–463, San Diego, CA XP218771, H. Komine et al "A Distributed Restoration Algorithm for Multiple-Link and Node Failures of Transport Networks".

Proceedings, IEEE Global Telecommunications Conference, 29 Nov. –2 Dec. 1993, vol. 3, pp. 1596–1600 Houston, J. Bicknell et al, "Performance Analysis of Fast Distributed Network Restoration Algorithms".

Symposium Record, IEEE 1992 Network Operations and Management Symposium, 6–9 Apr. 1992, Vo. 2 pp. 231–241, Memphis, XP 344698, H. Fujii et al "Transfer Mechanisms and Operation of Self–Healing Algorithms in ATM Networks".

"A fast distributed network restoration algorithm" by C. E. Chow, e.a., published in the Proceedings of the 12th International Phoenix Conference on Computers and Communications, Mar. 23–25, 1993.

Primary Examiner—Douglas W. Olms
Assistant Examiner—Matthew C. Phillips
Attorney, Agent, or Firm—Ware, Fressola, Van Der Sluys & Adolphson

[57] ABSTRACT

A method is described for rerouting a data stream previously routed via a route through a switching network which has now failed. The method includes the steps of detecting the failure on a link (L19) between first (SN1) and second (SN9) switching nodes in one of these switching nodes (SN1); transmitting from this one switching node (SN1) a request message (REQ) with first (IDA) and second (IDB) address fields containing addresses of the first (1) and second (9) switching nodes, respectively; in each switching node having received the request message (REQ) retransmitting it, until an alternative route for the data stream is found between two end switching nodes of said alternative route; and by one of these end switching nodes (SN1) chosen according to a predetermined rule after the alternative route has been found, allocating the data stream to this alternative route and transmitting it thereon.

33 Claims, 1 Drawing Sheet

METHOD FOR REROUTING A DATA STREAM

TECHNICAL FIELD

The present invention relates to a method for rerouting, upon failure of a route, a data stream previously routed via said route through a switching network

BACKGROUND OF THE INVENTION

Such a method of rerouting includes a plurality of switching nodes with respective addresses and interconnected by respective links used for setting up routes, and said method including the steps of:

- detecting said failure of said route on one of said links between first and second said switching nodes in at least said first switching node;
- transmitting from said first switching node and on each but said one of said links connected to it, a request message having first and second address fields containing addresses of said first and second switching nodes, respectively;
- in each of said switching nodes having received said request message on a link, retransmitting said request message on each link connected to it but said link on which said request message was received, until an alternative route for said data stream is found between two end switching nodes of said alternative route;
- allocating said data stream to said alternative route and transmitting it thereon.

Such a method is already known in the art, e.g. from the article 'A fast distributed network restoration algorithm' by C. E. Chow e.a., published in the Proceedings of the 12th International Phoenix Conference on Computers and Communications, March 23–26, 1993, Tempe, and more specifically from section III.B thereof. The method described therein applies to synchronous networks and provides one or more alternative routes for data streams previously routed via a link on which afterwards a failure occurred. The two switching nodes at the ends of such a failed link both detect this failure, thus each operating as the above first switching node, and are then arbitrarily designated as so-called Black- and Gray-origin nodes, respectively. These two switching nodes thereupon start transmitting so-called Black and Gray request messages, respectively, on all their outgoing links which have spare channels, each such request message including information as to the identity and the number of data streams for which alternative routes have to be provided. Further switching nodes, referred to in the article as intermediate nodes, receiving such a Black or Gray request message, become designated as Black or Gray nodes, respectively, and retransmit the received request messages, so that eventually Black request messages are received in Gray nodes and Gray request messages are received in Black nodes. Appropriate cross-connections are then made whereby an alternative route for at least part of the data streams to be rerouted is found, and the respective request messages are further transmitted along the respective paths so that Gray request messages finally arrive in the Black-origin node and Black request messages in the Gray-origin node. The Black-origin node then transmits an acknowledgement message to the Gray-origin node, whereas the Gray-origin node starts listening for this acknowledgement message. The Gray-origin node then chooses which of the data streams to reroute via the found alternative route and, upon receipt of the acknowledgement message, it sends a confirm message to the Black-origin node containing the identity of the latter data streams, together with an identity of the alternative route. Upon receipt of this message the Black-origin node makes the appropriate connections and the data stream is transmitted over the alternative route.

The above method is thus based on the insight that a fast recovery or restoration may be obtained by letting request messages originate in the two switching nodes on both sides of the failed link. However, the method does not apply to failures of switching nodes, nor does it apply when one of the two switching nodes on both sides of the failed link does not detect this failure.

SUMMARY OF THE INVENTION

An object of the present invention is to provide a method of the above known type but which also applies when one of the switching nodes of the switching network fails or when one of the two switching nodes on both sides of a failed link does not detect this link failure.

According to the invention, this object is achieved due to the fact that said allocation step is performed by a said end switching node chosen amongst said two end switching nodes according to a predetermined rule when said alternative route has been found.

In this way, the end switching node which has to allocate the data stream is only chosen after the alternative route has been found, thereby allowing to choose for the latter switching node one which is in fact able to perform the allocation. The invention is thus based on the insight that the mentioned shortcomings of the above prior art are due to the fact that the switching node which eventually allocates the data stream is already designated at the outset, i.e. upon detecting the failure, which may lead to a situation where a switching node is not aware that it is expected to allocate the data stream to the alternative route, e.g. because it has failed itself or because it did not detect the failure.

A further characteristic feature of the present invention is that said predetermined rule is based on the addresses of said end switching nodes.

Thus, the allocation is performed by either one of the end switching nodes.

Another characteristic feature of the present invention is that, when said request message is received in an intermediate one of said switching nodes which already received a further request message whose first and second address fields include the addresses of said second and first switching nodes, respectively, said alternative route is found between said first and second switching nodes, said intermediate switching node choosing said switching node performing said allocation.

Thereby, the alternative route is found in case of a link failure which is detected by both switching nodes on both sides of the failed link. Indeed, when a link failure has occurred and the switching nodes on both sides of the failed link, having e.g. respective addresses A and B, detect this failure, they both transmit a request message. The request message transmitted by the switching node with address A includes addresses A and B in its first and second address fields, respectively, whereas the request message transmitted by the switching node with address B includes addresses B and A in its first and second address fields, respectively. Thus, when the request message transmitted by the first switching node, e.g. the one with address A, reaches a switching node which already received the request message with the addresses of the second and first switching nodes in its first and second address fields, respectively, i.e. the request message transmitted by the switching node with address B, the alternative route is found. The allocation is then performed either by the switching node with address A or by the one with address B, as decided by the predetermined rule.

Still a further characteristic feature of the present invention is that, when said request message is received in said second switching node, said alternative route is found between said first and second switching nodes, said second switching node thereupon choosing said switching node performing said allocation.

Thus, even when the second switching node fails to detect the failure the alternative route is still found when the first switching node detects the failure. The method only not applies when a failure occurs which is not detected at all by the switching nodes. Indeed, when one of the switching nodes on both sides of the failed link, i.e. the second switching node, does not detect the link failure, the request message transmitted by the switching node which has detected the failure, i.e. the first switching node, finally arrives at the second switching node which then upon finding its own address in the second address field of this request message, decides the alternative route is found. The allocation is then performed by either the first or the second switching node, as decided by the predetermined rule.

An even further feature of the present invention is that, when said request message is received in an intermediate one of said switching nodes which already received a request message originating from a third switching node and whose second address field includes the address of said second switching node, said alternative route is found between said first and third switching nodes, said intermediate switching node choosing said switching node performing said allocation.

in this way, when a switching node, having e.g. address A, has failed, whereby a path from a switching node with address B via this failed switching node to a switching node with address C fails, and this failure is detected by both the switching nodes with addresses B and C, the latter switching nodes B and C both transmit a request message. The request message transmitted by the switching node with address B includes addresses B and A in its first and second address fields, respectively, whereas the request message transmitted by the switching node with address C includes addresses C and A in its first and second address fields, respectively. Thus, when the request message transmitted by the first switching node, e.g. the one with address B, arrives in a switching node which already received the request message with the address of the second switching node in its second address field, i.e. the request message transmitted by the switching node with address C, the alternative route across the failed switching node is found. The allocation is then performed either by the switching node with address B or by the one with address C, as decided by the predetermined rule.

Yet another feature of the present invention is that said switching node choosing the switching node performing said allocation, upon having made said choice, transmits to said end switching node chosen to perform said allocation a confirmation message.

Thus, the switching node chosen to perform the allocation is informed of this choice and only when it has received the confirmation message, the allocation of the data stream to the alternative route is performed.

An even further feature of the present invention is that said switching node chosen to perform said allocation, upon receipt of said confirmation message, transmits a connection message to the other end switching node indicating thereto said allocation of said data stream to said alternative route.

Thereby, the data stream is actually allocated to the alternative route.

Still another feature of the present invention is that said request message includes bandwidth fields with the bandwidth requested on the link on which it is transmitted from and to the switching node transmitting it, and that upon receipt of said request message in the latter switching node said requested bandwidth is reserved therein.

In this way, the reserved bandwidth can not be assigned to a further request message received by the latter switching node, thereby avoiding to assign an amount of bandwidth twice.

Another feature of the present invention is that, when said requested bandwidth is larger than the sum of bandwidths available to and from said latter switching node on all links connected to said latter switching node but said link on which said request message is received, said latter switching node stores an excess request message in a hold buffer provided thereto in said latter switching node, said excess request message indicating that an excess bandwidth requested in said received request message is not yet requested in transmitted request messages.

In this way, the amount of bandwidth which can not immediately be reserved in a switching node since it is reserved by other request messages which arrived earlier, is stored in memory means inside the node wherein the bandwidth has to be reserved.

Yet a further characteristic feature of the present method is that said excess request message includes bandwidth fields with said excess bandwidth from and to said latter switching node respectively and further includes a signature field with a signature of said received request message.

Thus, at each moment the switching node is aware of the requested bandwidth in any direction on the links connected thereto.

Furthermore, a characteristic feature of the present method is that, when later on bandwidth on a link connected to said latter switching node which is different from said link whereon said request message is received becomes available, a request message is transmitted on said link whereon said bandwidth becomes available, wherein the bandwidth requested equals the minimum of said excess bandwidth and said bandwidth that becomes available, and said excess request message is modified in such a way that it indicates remaining not yet requested bandwidth.

Thus, whenever spare bandwidth previously reserved by a request message is released, this bandwidth becomes reserved by excess request messages stored in the hold buffer of the respective switching node. As a result, the amounts of bandwidth requested by the excess request messages are decreased.

Still another characteristic feature of the present invention is that, when said minimum equals said excess bandwidth, said excess request message is erased from said hold buffer.

In this way, an excess request message stored in the hold buffer of a switching node is removed therefrom once the bandwidths specified in its bandwidth fields are fully reserved on links connected to this switching node.

Another characteristic of the present invention is that said request message includes an overrequest field which when the sum of the bandwidths requested for a same alternative route in request messages transmitted by a said switching node is larger than the bandwidth requested by a request message for said same alterative route received by the latter switching node, includes the latter received requested bandwidth.

Thereby, when a switching node receives different request messages for a same alternative route, i.e. which come from a same switching node, the former switching node transmits a request message which possibly includes an overrequest field allowing to later on avoid an excessive request for bandwidth.

Still another characteristic of the present invention is that said confirmation message includes a bandwidth field with the bandwidth allocated to said alternative route.

In this way, the bandwidth already reserved for the alternative route between the confirm node and the node chosen to perform the allocation is indicated to the node chosen to perform the allocation.

An additional feature of the present invention is that said request message includes a hop count value which upon each rebroadcasting thereof is increased by one.

This hop count value may be used to restrict the area of switching nodes around the failure wherein an alternative route is searched.

Also an additional feature of the present method is that, when said requested bandwidth is larger than the sum of bandwidths available to and from said latter switching node on all links connected to said latter switching node but said link on which said request message is received, and when there is no chance that later on bandwidth becomes available on a link connected to said latter switching node which is different from said link whereon said request message is received, said latter switching node transmits a RELREQIN release message on said link whereon said request message is received to indicate that bandwidth reserved thereon should be released.

Thus, excess request messages are stored in the hold buffer of a switching node only when there is a chance that a request message may be flooded at a later time, i.e. only when there is spare bandwidth which is currently reserved by other request messages which arrived earlier in the respective switching node. When there is no chance that bandwidth will become available at a later time a RELREQIN release message is sent back to the node which transmitted the request message.

Yet an additional feature of the present method is that, when a said switching node receives a said confirmation message, said switching node transmits a RELREQOUT release message on each link connected to said switching node whereon superfluous bandwidth is reserved previously.

In this way, bandwidth which was previously reserved and in no longer necessary is released on links connected to a switching node from the moment on sufficient bandwidth is available on one of the links. Surplus bandwidth reservations are thus cancelled.

Moreover, a characteristic feature of the present invention is that, when a said switching node on said alternative route between said switching node choosing said switching node performing said allocation and said second end switching node not chosen to perform said allocation receives a said connection message, said switching node transmits a RELREQOUT release message on each link connected to said switching node whereon superfluous bandwidth is reserved previously.

Thus, in a similar way as described above, surplus bandwidth reservations in the alternative path section between the confirm node and the second end switching node, are released. The information necessary to determine the amount of bandwidth that has to be released now is obtained from the connection message.

A further characteristic feature of the present method is that, when said request message is received in an intermediate one of said switching nodes which already transmitted on said link whereon said request message is received in said intermediate switching node, a further request message whose first and second address fields include the addresses of said second and first switching nodes respectively, said alternative route is found between said first and second switching nodes, either said intermediate node or said node where said request message is received from being designated confirmation node, said confirmation node transmitting a confirmation message to said end switching node chosen to perform said allocation and the one of said intermediate node and said node where said request message is received from which is not said confirmation node transmitting a RELNACK release message on said link whereon said request message and said further request message are transmitted to either cancel said request message or said further request message depending on the choice of said confirmation node.

Indeed, at the meeting point of two request branches, two adjacent nodes will send each other request messages. Thereupon, both adjacent nodes want to become confirm node. To avoid this situation wherein two nodes would start, transmitting confirmation messages towards the node chosen to perform the allocation, only one node, e.g. the node closest to the node chosen to reallocate the data stream, is allowed to transmit a confirmation message and becomes thus the confirmation node. This confirmation node thereupon cancels its request message towards the adjacent node upon receipt of a RELNACK release message from the node not being the confirmation node Also a feature of the present invention is that, whenever available bandwidth is requested in two said request messages transmitted in opposite directions on a said link by two of said switching nodes connected thereto, one of said switching nodes is designated master node whilst the other is designated slave node, said available bandwidth being assigned to said request message transmitted by said master node and said request message transmitted by said slave node being cancelled by a RELNACK release message.

Thus, to avoid a situation wherein two adjacent nodes simultaneously try to reserve bandwidth on the link coupled between them, each link has a master node and a slave node. When both nodes try to reserve bandwidth on the same link, only the request of the master node will succeed. The request of the slave node is cancelled via a RELNACK release message.

Still an additional characteristic feature of the present invention is that, when a said switching node receives a said confirmation message wherein superfluous bandwidth is allocated to said alternative route, a RELCONFOUT release message is transmitted on said link whereon said confirmation message is received.

Thus, if confirmed bandwidth becomes reduced due to overrequest violation, a RELCONFOUT release message is sent towards the confirm node.

Still a further characteristic feature of the present method is that, when a said RELREQOUT release message is received in said switching node choosing said switching node performing said allocation, a RELCONFIN release message is transmitted by said switching node choosing said switching node performing said allocation to indicate that a confirmation message previously transmitted therefrom should be cancelled or that the bandwidth specified therein should be reduced.

Thus, superfluous confirmed bandwidth becomes also reduced if in the alternative route section between the confirmation node end the second end switching node over-request violation occurs.

The invention also relates to a method for rerouting upon failure of a route, a data stream previously routed via said route through a switching network which includes a plurality of switching nodes with respective addresses and interconnected by respective links used for setting up routes, said method including the steps of:

broadcasting trigger messages in a controller node;
in each of said switching nodes having received a said trigger message on a receipt link, transmitting to said controller node an information message containing the amounts of bandwidth available on the links connected to it, and rebroadcasting said trigger message on each link connected to it but said link on which said trigger message was received;
in said controller node, calculating from said received amounts of bandwidth an alternative route for said data stream and thereupon allocating said route to said data stream;
transmitting said data stream on said alternative route.

Such a method is known in the art and generally is based on an information phase in which the information messages are collected in a preassigned central controller node, which is followed by a calculation phase in which the central controller node performs the calculation of the alternative route. As in the above first described method this has the disadvantage that this preassigned central controller node may not be able to perform such collection and calculation e.g. because it has failed or because one or more of the links connected to it have failed.

Therefore, a further object of the present invention is to provide a method as described above but which allows to in any case perform the collection of the information messages and the calculation of the alternative route.

This further object is achieved due to the fact that a said switching node having detected said failure is, according to a predetermined rule, chosen as said controller node.

In this way, the controller node is not a preassigned one but is chosen amongst the switching nodes which have detected the failure according to the predetermined rule.

A further feature of the present invention is that it includes the additional steps of:

in a said switching node having detected said failure transmitting control messages having a control field for containing the address of said controller node and which is initialized with the address of said detecting switching node;
in each switching node receiving a said control message, transmitting an adapted said control message whose control field is adapted according to a predetermined rule.

Thus, the address of the controller node is contained in the control field and upon each receipt of the control message this control field is adapted according to the predetermined rule, so that the controller node may be chosen in a flexible way depending upon the predetermined rule chosen.

An even further feature of the present invention is that said predetermined rule is based on the contents of the control field of said received control message and the address of said switching node in which it is received.

Thereby, an easily implementable but flexible algorithm for the predetermined rule may be chosen, for instance the adapted contents of the control field may be the smallest of the received contents and the address of the receiving switching node, or any other decision rule.

Another characteristic feature of the present invention is that said trigger message includes a hop count value which upon each rebroadcasting thereof is increased by one.

This hop count value may be used to restrict the area of switching nodes around the failure from which information as to the available bandwidth is collected, and wherein subsequently an alternative route is calculated. It is to be noted that the larger the allowed hop count the larger this area, the more difficult and time-consuming the necessary calculations for calculating the alternative route, and the larger the probability that the data stream may be fully rerouted.

Yet a further feature of the present invention is that said trigger message includes a controller field including the address of said controller node.

Thus, a switching node receiving the trigger message is informed of the address of the controller node, whereby the information message may be transmitted thereto.

Yet another feature of the present invention is that each said switching node receiving a said trigger message stores an identity of said link on which said trigger message was received in a storage means thereof.

In this way, although a switching node receiving the trigger message is not informed of the address of the controller node, the information message may still be transmitted thereto by transmitting it on the link on which the trigger message was received.

In a further embodiment of the present invention, it is used for rerouting a plurality of data streams, and that when not all data streams have been restored after a predetermined time period has elapsed, then a method according to claim 26 is applied in order to restore the rest of said data streams.

Thereby, the latter method functions as a back-up method for restoring data stream parts or data streams which are unable to be restored by the first described method or which take too long a time to be restored by the this first described method.

BRIEF DESCRIPTION OF THE DRAWING

The above mentioned and other objects and features of the invention will become more apparent and the invention itself will be best understood by referring to the following description of an embodiment taken in conjunction with the accompanying single drawing which represents a switching network in which methods for rerouting according to the invention are applied when a link or node failure occurs.

BEST MODE FOR CARRYING OUT THE INVENTION

Figure 1:
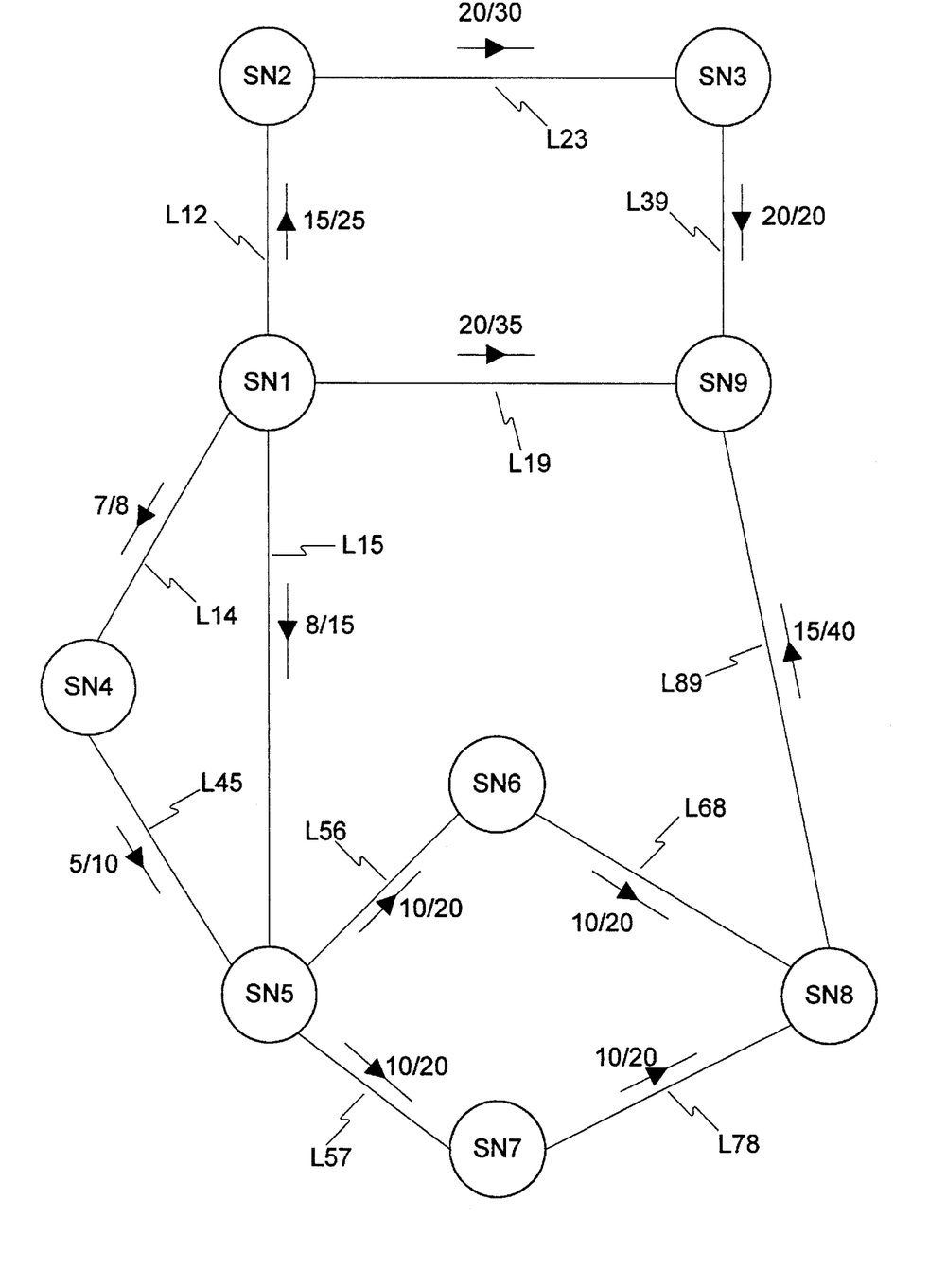

The switching network includes a plurality of switching nodes, of which nine switching nodes, SN1 to SN9, are shown, SNx designating a switching node with address x. These switching nodes are interconnected via links Lxy where Lxy designates a link between switching nodes SNx and SNy. It should be noted that such a link may consist of plural physical connections, i.e. e.g. a plurality of optical fibres. For each link Lxy the bandwidth available on Lxy is indicated by a couple of numbers separated by a slash: a/b, where a is the bandwidth in Mbit/sec available on Lxy in the direction from the switching node with lowest to the one with highest address as indicated by the accompanying arrow, i.e. for instance from SN1 to SN9 on L19, whereas b is the bandwidth in Mbit/sec available in the opposite direction. More specifically, the following links and associated available bandwidths are present: L12, L14, L15, L19, L23, L39, L45, L56, L57, L68, L78, L89 with respective available bandwidths 15/25, 7/8, 8/15, 20/35, 20/30, 20/20, 5/10, 10/20, 10/20, 10/20, 10/20, 15/40, all bandwidths being expressed in Mbit/sec.

The switching network described is a so-called Asynchronous Transfer Mode (ATM) switching network, i.e. data is exchanged according to the ATM protocol, and the switching nodes are ATM switching nodes. The switching network as shown in the drawing is part of a data communications network via which data can be exchanged between users thereof. For instance, video signals may be routed through the latter network from a video server to users for a so-called video on demand service, computer data may be exchanged between different computers, or any kind of signals may be exchanged between different users of the network. Thus, a plurality of data streams is routed through so-called virtual paths set up through the switching nodes of the network shown in the drawing.

It should be noted however that the switching network may also be based on the Synchronous Digital Hierarchy (SDH) protocol in which case the data streams are routed through channels having unity bandwidth instead of the above virtual paths.

When a failure of a link or a switching node occurs, the data streams routed through this link or this switching node have to be rerouted as much as possible, i.e. alternative routes or alternative virtual paths for these data streams have to be found in the switching network. The way in which such alternative routes are found is now described first for the case of a link failure, e.g. of link L19, and then for the case of a node failure, e.g. of switching node SN6.

It should be noted that in order to simplify the following description of how the method according to the invention is realized, in this description sometimes nodes are considered isolated from the rest of the network and that situations are assumed in these nodes which, when considering the complete network, would not occur. These situations are however not fictive, but could occur in case of different configuration of the network.

When the link L19 fails, one or more alternative routes for the data streams routed therethrough have to be found between switching nodes SN1 and SN9. The total bandwidth of these alternative routes should be such that all the latter data streams may be routed therethrough. In the following the total bandwidth of the data streams to be restored is assumed to be 20 Mbit/sec in the direction from SN1 to SN9, and 35 Mbit/sec in the direction from SN9 to SN1. Note that these figures have no connection to the figures for the available bandwidth indicated on the drawing, which by coincidence are the same. It should be noted also that in the following the unit of bandwidth, viz. Mbit/sec, is omitted for convenience.

First, the case is now described where both the switching nodes SN1 and SN9 detect the failure of link L19. Upon detecting this failure on link L19, a restoration procedure is started and switching node SN1 transmits a request message on each of the links connected to it except link L19, i.e. on links L12, L14 and L15. This request message has the following form:

| REQ | SIG | IDA | IDB | BWAB | BWBA | OVERRQ | HOPCT |

Herein:

REQ indicates that the message is a request message;

SIG is a signature of the request message which allows to distinguish between different request messages transmitted by a same switching node and allowing to search for different alternative routes for a same failure;

IDA is a first address field containing the address of the switching node which has detected the failure and from which the request message originates, in this case '1';

IDB is a second address field containing the address of the switching node on the other side of the link on which the failure was detected, in this case '9';

BWAB is a field containing the minimum of the bandwidth requested for the alterative route in the direction from the switching node from which the request message originates, i.e. SN1, to the switching node on the other side of the failed link, i.e. SN9, in this case 20 (Mbit/sec), and the available bandwidth in this direction on the respective link on which the request message is transmitted;

BWBA is a field containing the minimum of the bandwidth for the alternative route in the opposite direction, in this case 35, and the available bandwidth in that direction on the respective link on which the request message is transmitted;

OVERRQ is a field containing so-called overrequest data consisting of two parts, viz. firstly the contents of OVERRQ of received request message, if any, and secondly the address of the switching node forwarding the request message combined with the bandwidth originally requested, this second part only being added when the sum of the bandwidth requested in the transmitted request messages is larger than either the bandwidth requested in the received request message, or the total bandwidth requested by the failure detecting switching node if the request message is transmitted by the latter switching node;

HOPCT is a field containing a hop count value which is incremented with one upon each retransmission of the request message and is initialized to 1 by the switching node from which the request message originates, i.e. SN1; this hop count value is related to a predetermined maximum hop count value, which is assumed to be 5 for the present case, as explained hereinafter. When the hop count exceeds the maximum hop count, no further request messages are sent out.

It should be noted that when SN1 has detected a failure on more than one link, the different request messages to be transmitted for these failures may be combined; the resulting request message then contains several addresses IDB instead of only one.

Thus, the request message originating from SN1 and transmitted by SN1 on, e.g., link L15 to switching node SN5, has the following form:

| REQ | 1 | 1 | 9 | 8 | 15 | 1-20/35 | 1 |

Herein, SIG is assumed to be set to 1. The bandwidth requested on links L12 and L14 being 15/25 and 7/8, respectively, the sum of the requested bandwidth is larger than the total requested bandwidth, i.e. 20/35. Therefore, OVERRQ is equal to 1 (address of SN1)—20/35 (total bandwidth requested by SN1). The bandwidth thus requested by this request message is furthermore reserved in the switching node SN1, i.e. until this reservation is released subsequent request messages are no longer able to request this bandwidth.

Upon receipt of this request message in SN5, SN5 becomes a so-called tandem node, and the request message is stored in a buffer (not shown) thereof. SN5 then transmits an adapted request message on all the links connected to it except link L15 on which the request message was received, i.e. on the links L45, L56 and L57. This adapted request message differs from the received one in that:

the field BWAB contains the minimum of its value in the received request message and the available bandwidth on the respective link;

a similar adaptation applies to BWBA;

OVERRQ is adapted;

the contents of the field HOPCT is incremented with one, and thus becomes equal to 2.

Thus, for instance the request message transmitted by SN5 via link L45 to SN4 has the form:

| REQ | 1 | 1 | 9 | 8 | 5 | 1-20/35;5-8/15 | 2 |

Similar request messages as described above and transmitted to SN5 are transmitted on links L12 and L14 to switching nodes SN2 and SN4, respectively, where their contents is adapted and they are thereupon retransmitted.

In the request message thus transmitted over link L14 to SN4 for instance, the bandwidth requested is 7/8. Supposing the above request message from SN5 to SN4 via link L45 has not yet been transmitted by SN5 so that the bandwidth 8/5 has not yet been reserved, then the available bandwidth on link L45 is 5/10, whereby the bandwidth requested in the request message transmitted from SN4 to SN5 is 5/8, i.e. in the direction from SN1 to SN9 the bandwidth requested decreases from 7 to 5. The difference, viz. 2, could be written to a hold buffer (not shown) included in SN4. Thus, this hold buffer of SN4 then would include a message, called an excess request message, indicating that an excess bandwidth 2/0 requested in a received request message is not yet requested in a transmitted request message. When later on bandwidth would become available due to the release of connections or the release of reserved bandwidth, a request message could be forwarded wherein the bandwidth requested would be the minimum of 2/0 and the then available bandwidth, and the above message in the hold buffer would be changed to indicate the remaining not yet requested bandwidth. To be noted that this request message would have the same signature SIG as the request message originally forwarded, viz. 1. When the bandwidth of 2/0 would be fully requested, the message in the hold buffer would be erased. However, as is seen from the FIGURE, there is no chance that the stored excess request message may be flooded at a later time since there is no spare bandwidth that is currently reserved by other request messages which arrived previously in SN4. Therefore, such an excess request message is not stored in the hold buffer in this case. Instead, a RELREQIN release message is transmitted by SN4 on the link whereon the request message is received, i.e. on L14, to SN1. Such a RELREQIN release message has the following form;

| RELREQIN | SIG | BW1 | BW2 |

Herein:

RELREQIN indicates that the message is a release message, transmitted from a switching node which received a request message to the switching node which transmitted this request message to indicate thereto that there is no sufficient spare bandwidth on links connected to the switching node which received the request message;

SIG is a signature of the release message allowing to distinguish between different RELREQIN release messages transmitted by a same switching node for different alternative routes;

BW1 is a field containing an indication of the bandwidth to be released for the alternative route in the direction from the switching node from which the release message originates to the one to which it is transmitted;

BW2 is a field containing an indication of the bandwidth to be released for the alternative route in the opposite direction.

In the considered embodiment, and this for all type of release messages involved in the subject method, this indication is in fact that part of the previously requested or reserved bandwidth which should remain requested or reserved. The reason for specifying the bandwidth to be released in this way, is that in case for instance a RELREQOUT message and a RELREQIN message are transmitted from a node A to a node B and vice versa respectively, and when previous releases are not taken into account, too much bandwidth will be released.

In the particular situation described above, such a release message will be transmitted from SN4 to SN1 on link L14. This release message has the form:

| RELREQIN | 3 | 5 | 8 |

Herein, SIG is set to 3 since it is assumed that the signature field includes a copy of the signature field of the request message where this release message is an answer to. It is supposed that SN1 transmits three request messages, the first of which, with signature 1, is transmitted on L15 to SN5, the second of which, with signature 2, is transmitted on L12 to SN2, and the third of which, with signature 3, is transmitted on L14 to SN4. The above RELREQIN release message is transmitted by SN4 on L14 since the bandwidth requested in the request message of SN1 with signature 3 can not become available on links connected to SN4. The signature field of this RELREQIN release message includes thus a copy of the signature of the request message, which is 3. To be noted that the signature value should be unique on one link which means that for instance the value I could be used on each of the above mentioned links.

Likewise, switching node SN9 upon detection of the failure on link L19 transmits request messages on links L39 and L89, e.g. on link L89 the request message has the form:

| REQ | 1 | 9 | 1 | 35 | 15 | 9-35/20 | 1 |
|---|---|---|---|---|---|---|---|

After some time, request messages originating from SN1 start arriving at switching nodes who already received a request message originating from SN9, or, vice versa, those originating from SN9 arrive at switching nodes which already received a request message originating from SN1. For instance may the request message originating from SN1 and transmitted via link L12 be retransmitted by SN2 and arrive at switching node SN3, which has then already received the request message originating from SN9 and transmitted via link L39.

The request message originating from SN1 and arriving in SN3 has the form:

| REQ | 1 | 1 | 9 | 15 | 25 | 1-20/35 | 2 |
|---|---|---|---|---|---|---|---| wherein the field OVERRQ has the same contents as the one in the request message received by SN2 from SN1 since the sum of the bandwidth requested by SN2 in its transmitted request message(s) is not larger than the bandwidth requested in the request message received from SN1, but equal. The request message originating from SN9 and arriving in SN3 has the form:

| REQ | 1 | 9 | 1 | 20 | 20 | 9-35/20 | 1 |
|---|---|---|---|---|---|---|---|

The last one received of the latter two request messages is compared to the first one received. Since the contents of the address fields IDA and IDB of the first of both request messages are equal to those of the address fields IDB and IDA, respectively, of the second request message, an alternative route for at least part of the data streams to be rerouted is found, and switching node SN3 now becomes a so-called confirmation node and transmits a confirmation message to the switching node SN1 on the respective link on which the request message from SN1 was received.

It has to be noticed that at the meeting point of two request branches, the situation wherein two nodes become confirmation node will almost always occur if no further precautions are provided. Indeed, two adjacent nodes, e.g. nodes SN2 and SN3, will send each other a request message. SN2 which already received a request message from SN1 will become confirmation node upon receipt of the request message from SN3. Similarly, SN3, which already received a request message from SN9, will become confirmation node upon receipt of the request message from SN2. Thus, a procedure has to be provided to prevent that both nodes, SN2 and SN3, start transmitting confirmation messages. Therefore it is decided that the switching node SN2 which is closest to the node SN1 chosen to reallocate the data stream will become confirmation node and is thus allowed to transmit a confirmation message towards this node SN1 chosen to allocate the data stream. The request message earlier transmitted by the confirmation node SN2 towards the adjacent node SN3 now has to be discarded. This is done by the switching node SN3, which upon receipt of the request message, checks whether it has already sent an equivalent request message in the opposite direction, i.e. towards SN2, and which transmits a RELNACK release message on the link L23 to SN2 if it has already transmitted such an equivalent request message. Indeed, the node SN3 first has to check whether it has sent such a request message because it might for example be that the hop count value in the request message received from SN9 reached its maximum value in this switching node SN3 as a result of which no such request message was transmitted to SN2. The RELNACK release message has the following form:

| RELNACK | SIG | BW1 | BW2 |
|---|---|---|---|

Herein:
RELNACK indicates that the message is a release message transmitted by a switching node which received a request message on the link whereon this switching node already transmitted an equivalent request message for the same alternative route;
SIG is a signature of the release message allowing to distinguish between different RELNACK release messages transmitted by a same switching node for different alternative routes;
BW1 is a field containing an indication of the bandwidth to be released for the alternative route in the direction from the switching node from which the release message originates to the one to which it is transmitted;
BW2 is a field containing an indication of the bandwidth to be released for the alternative route in the opposite direction.

For instance, the release message transmitted from SN3 to SN2 has the form:

| RELNACK | 1 | 25 | 15 |
|---|---|---|---|

It is further remarked here that such a RELNACK release message is transmitted by a switching node whenever the requested bandwidth in a request message is not available since it was reserved by an earlier request message in the opposite direction on the same link. For this kind of arbitration, each link has a master node and slave node. When both nodes try to reserve bandwidth on the same link, only the request message from the master node will succeed. The request message from the slave node will be cancelled or reduced by a RELNACK release message. In the above example where two request branches meet each other, the node SN2 closest to the node SN1 which has to reallocate the data stream becomes confirmation node. This node, SN2, thereupon will be treated similar to a slave node since the request message transmitted thereby has to be cancelled.

Suppose again to be in the earlier described situation wherein SN3 becomes confirmation node. The above confirmation message, transmitted by confirmation node SN3 towards SN1, has the following form:

| CNF | SIG | CHR | CHN | BWRN | BWNR | OVERRQ |
|---|---|---|---|---|---|---|

Herein:
CNF indicates that the message is a confirmation message;
SIG is a signature field containing a request signature referring to the request which is being confirmed and a confirmation signature allowing to distinguish between different confirmation messages transmitted by a same confirmation node for different alternative routes searched for a same failure;

CHR is a first address field containing the address of a so-called chooser node, as will be explained later;

CHN is a second address field containing the address of a so-called chosen node, as will be explained later;

BWRN is a field containing the confirmed bandwidth for the alternative route in the direction from the chooser node to the chosen node;

BWNR is a field containing the confirmed bandwidth for the alternative route in the opposite direction, i.e. from chosen node to chooser node;

OVERRQ is a field containing overrequest data consisting of the contents of the field OVERRQ in corresponding received request messages, i.e. in the direction to the chooser node the overrequest data received from the direction of the chosen node is included.

The confirmation node SN3 now first indicates one of the two switching nodes whose addresses are given in the address fields of the received request messages, viz. switching nodes SN1 and SN9, as a chooser node and the other as a chosen node. This is done according to a predetermined rule, viz. the switching node with the lowest of the two addresses, i.e. SN1, is indicated as chooser node, and the other switching node, i.e. SN9, is indicated as chosen node. The purpose of this indication is to allow one switching node, viz. the chooser node, to decide about which of the data streams to be rerouted are in fact rerouted to the alternative route, i.e. which data streams are assigned to which virtual paths of the alternative route. From the comparison of the bandwidth availability figures in both received request messages it is furthermore found that the bandwidth of the alternative route found is 15, viz. the minimum of the contents of BWAB in the request message received from SN1 and BWBA in the request message received from SN9, in the direction from SN1 to SN9, and 20 in the direction from SN9 to SN1. Hence, the confirmation message transmitted by SN3 on link L23 has the following form:

| CNF | 1 | 1 | 9 | 15 | 20 | 9-35/20 |
|-----|---|---|---|----|----|---------|

For the confirmation message transmitted by SN3 to SN1 OVERRQ contains the data 9-35/20.

When this confirmation message is received in SN2, it is retransmitted in an unchanged form—indeed, OVERRQ also remains equal to 9-35/20—on the link on which SN2 received the original request message, i.e. on link L12.

Furthermore, since in SN2 a bandwidth was reserved equal to 15/25, and a confirmation is now only given for a bandwidth of 15/20, a bandwidth equal to 0/5 is still required in SN2. This can only be resolved by a second confirm from SN3 on a second alternative route on the chosen side. In the considered case however, SN3 will together with the confirm message send a RELREQIN to SN2 for the remaining 0/5, since no more bandwidth is available. Supposing SN2 would have received an additional confirm from e.g. an additional link, then supposing the related request was for more than 0/5, part of the reserved bandwidth would have to be released. Such release of excessively reserved bandwidth is the purpose of the confirmation message. When a confirmation message is received in a switching node, this switching node compares the confirmed bandwidth to the originally requested bandwidth and transmits RELREQOUT release messages for bandwidth excessively requested on respective links.

Such a RELREQOUT release message has the following form;

| RELREQOUT | SIG | BW1 | BW2 |
|-----------|-----|-----|-----|

Herein:

RELREQOUT indicates that the message is a release message transmitted by a switching node which previously transmitted a request message on the link whereon the release message is transmitted, wherein a superfluous amount of bandwidth was requested;

SIC is a signature of the release message allowing to distinguish between different RELREQOUT release messages transmitted by a same switching node for different alternative routes;

BW1 is a field containing an indication of the bandwidth to be released for the alternative route in the direction from the switching node from which the release message originates to the one to which it is transmitted;

BW2 is a field containing an indication of the bandwidth to be released for the alternative route in the opposite direction.

For instance, supposing SN6 is a confirmation node, it transmits one or more confirmation messages to SN5 confirming a total bandwidth equal to 10/20. Since, and when isolating the part of the network including SN4, SN5, SN6 and SN7, the originally requested bandwidth was 13/25 (the sum of the one coming from L15 and from L45) an outstanding request for a bandwidth equal to 3/5 remains. Hence, a RELREQOUT release message for a bandwidth of 7/15 is transmitted on link L57. This RELREQOUT release message has the following form:

| RELREQOUT | 1 | 3 | 5 |
|-----------|---|---|---|

When this release message is received in SN7, the bandwidth of 7/17 which was superfluously reserved in SN7 is released. The signature field SIG contains a copy of the signature of the request message previously transmitted from SN5 to SN7. It is supposed here that the signature of this request message is 1.

In order to be able in the following to consider an overrequest situation, SN9, SN8, SN6 and SN7 are considered isolated from the rest of the network. Upon a request 15/40 from SN9 to SN8, the latter requests 10/20 on L68 and 10/20 on L78. When a confirmation is thereafter received by SN8 from SN6 and SN7 this results in an overrequest. Therefore part of the bandwidth, i.e. 5/0, reserved has to be released. A RELCONFOUT release message is transmitted then to the switching node which transmitted the last confirmation message whereby superfluous bandwidth became reserved. This RELCONFOUT release message has the following form:

| RELCONFOUT | SIG | BW1 | BW2 |
|------------|-----|-----|-----|

Herein:

RELCONFOUT indicates that the message is a release message transmitted to a switching node which previously transmitted a confirmation message on the link whereon the release message is transmitted, whereby an amount of superfluous bandwidth was reserved;

SIG is a signature of the release message allowing to distinguish between different RELCONFOUT release messages transmitted by a same switching node for different alternative routes, and is made equal to the signature of the confirmation message previously transmitted on the respective link;

BW1 is a field containing an indication of the bandwidth to be released for the alternative route in the direction from the switching node from which the release message originates to the one to which it is transmitted;

BW2 is a field containing an indication of the bandwidth to be released for the alternative route in the opposite direction.

When the confirmation message originating from SN3 is received in the switching node SN1, this switching node becomes the chooser node and decides which data streams are to be routed via the alternative route and which virtual paths are allocated thereto. The chooser node then transmits a connection message to SN9 informing it of this decision. This connection message has the following form:

| CON | SIG | VPS | BWR | BWN |
|-----|-----|-----|-----|-----|

Herein:

CON indicates that the message is a connection message;

SIG is a signature of the connection message allowing to distinguish between different connection messages transmitted by a same chooser node for different alternative routes for a same failure;

VPS is a field containing identifications of the virtual paths or data streams to be allocated to the alternative route and of their associated bandwidths;

BWR is a field containing the bandwidth for the alternative route in the direction from the chooser node to the chosen node;

BWN is a field containing the bandwidth for the alternative route in the opposite direction, i.e. from chosen node to chooser node.

The connection message transmitted by SN1 to SN9 thus has the following form:

| CON | 1 | VP1, VP2, ... | 15 | 20 |
|-----|---|---------------|----|----|

Herein, VP1, VP2, ... are the identifications of the virtual paths to be allocated.

When this connection message is received in SN9, the data streams or virtual paths VP1, VP2, ... are in fact rerouted via the alternative route.

Upon receipt of such a connection message CON in a switching node on the alternative path between the confirm node, which is SN3 in the above example, and the chosen node, which is SN9 in the above example, release messages will be transmitted on links whereon superfluous bandwidth is requested previously. Of course, reference to the above example is useless since the alternative path contains no switching nodes between SN3 and SN9. Therefore, the technique explained in this paragraph should only be considered in the fictive situation wherein the alternative path contains such intermediate switching nodes between the confirmation node and the chosen node. These RELREQOUT release messages are similar to the above described RELREQOUT release messages but the latter release messages were transmitted upon receipt of a confirmation message in a switching node between the confirm node SN3 and the chooser node SN1. The RELREQOUT release messages transmitted in response to connection messages to release bandwidth superfluously requested have the following form:

| RELREQOUT | SIG | BW1 | BW2 |
|-----------|-----|-----|-----|

Herein:

RELREQOUT indicates that the message is a release message transmitted by a switching node which previously transmitted a request message on the link whereon the release message is transmitted, wherein an amount of superfluous bandwidth was requested;

SIG is a signature of the release message allowing to distinguish between different RELREQOUT release messages transmitted by a same switching node for different alternative routes;

BW1 is a field containing an indication of the bandwidth to be released for the alternative route in the direction from the switching node from which the release message originates to the one to which it is transmitted;

BW2 is a field containing an indication of the bandwidth to be released for the alternative route in the opposite direction.

When such a RELREQOUT release message reaches the confirmation node SN3 from the chosen side in the alternative route, the confirmation message that was sent thereby will be cancelled or the bandwidth reserved therein will be reduced by a RELCONFIN release message of the following form:

| RELCONFIN | SIG | BW1 | BW2 |
|-----------|-----|-----|-----|

Herein:

RELCONFIN indicates that the message is a release message transmitted by a confirmation node to cancel an earlier transmitted confirmation message or reservation of part of the bandwidth specified therein, i.e. which converts confirmed reserved bandwidth into requested bandwidth, this reserved bandwidth being superfluous due to overrequest congestion in the alternative path between this confirmation node and the chosen node;

SIG is a signature of the release message allowing to distinguish between different RELCONFIN release messages transmitted by a same switching node for different alternative routes;

BW1 is a field containing the resulting reserved bandwidth after the above conversion of reserved bandwidth into requested bandwidth for the alternative route in the direction from the switching node from which the release message originates to the one to which it is transmitted;

BW2 is a field containing the resulting reserved bandwidth after the above conversion from reserved bandwidth into requested bandwidth for the alternative route in the opposite direction.

The RELCONFIN is sent out by the confirmation node and is further transmitted by each node between the confirmation node and the chooser node until it reaches a related RELCONFOUT coming from another direction.

Likewise, alternative routes with bandwidth 8/15 are found from SN1 via SN5, SN6/7 and SN8 to SN9, and with bandwidth 5/8 from SN1 via SN4, SN5, SN6/7 and SN8 to SN9. When first the alternative route via SN2 and SN3 is found restoring a bandwidth of 15/20, then a requested bandwidth of 5/15 remains and a RELREQOUT release message for a bandwidth 3/0 is transmitted to SN5. No RELREQOUT is sent for a bandwidth 2/0 to SN4 since this bandwidth was already release as a result of the RELREQIN sent previously by SN4 as was explained earlier. As a consequence the bandwidth reserved in SN5 is reduced from 13/23 (8/15 from SN1 plus 5/8 from SN4) to 5/15 (5/15 from SN1 and 5/8 from SN4). Likewise, a RELREQOUT release message for a bandwidth of 5/5 will then be transmitted to SN6 and SN7. When then the alternative route via SN5, SN6/7 and SN8 able to restore a bandwidth of 5/15 is found, the remaining requested bandwidth is reduced to zero and the data streams are fully restored.

It is to be noted that the request message received by SN5 from SN1 requests a bandwidth equal to 8/15 and is forwarded on links L56 and L57 with an OVERRQ field equal to 1-20/35;5-8/15. Both request messages then again being transmitted on links L68 and L78, respectively, they are eventually received in SN8. When SN8 then becomes a confirmation node it may transmit confirmation messages for at least two alternative routes each associated to a respective one of the latter two request messages. The total bandwidth requested however is equal to 8/15 instead of twice this bandwidth due to the OVERRQ field included in both request messages.

When, however, the data streams are not fully restored after a predetermined time, a further phase of the restoration procedure may be entered in which restoration routes may be calculated from any switching node in a restoration area of switching nodes to be defined to any other switching node therein, instead of between switching nodes on both sides of a failure. The latter phase will be described later.

When the switching node SN9 does not detect the failure on the link L19, the request messages transmitted by SN1 finally arrive in SN9 where the contents of the second address field of the request message, i.e. IDB, is compared with the address of SN9 which is found to be equal thereto, whereby an alternative route is found. Switching node SN9 then acts as the confirmation node making the procedure fully analogous to the above described one.

The case is now described where a node failure occurs, e.g. of the switching node SN6. The bandwidth to be restored is assumed to be equal to 5/15.

When the switching node SN5 detects this failure of SN6 on link L56, it transmits request messages on links L15, L45 and L57, e.g. on L57 of the following form:

| REQ | 1 | 5 | 6 | 5 | 15 | 5-5/15 | 1 |

On the other hand, SN8 detecting the failure on L68 also transmits request messages, e.g. on link L78 of the form:

| REQ | 1 | 8 | 6 | 15 | 5 | 8-15/5 | 1 |

When the latter two request messages are received e.g. in SN7, a comparison of the address fields thereof indicates that an alternative route is found from SN5 via SN7 to SN8 across a failure of switching node SN6. SN7 then becomes a confirmation node indicating SN5 as chooser node and SN8 as chosen node, and transmits confirmation messages to SN5 and SN8 confirming that an alternative route with bandwidth 5/15 from SN5 to SN8 is found. Finally, data streams or virtual paths to be rerouted are allocated to the thus found alternative route by the chooser node SN5 whereupon a connection message is transmitted from SN5 via SN7 to SN8 so that the latter data streams are in fact rerouted.

It should be noted that each of the above request, confirmation, release and connection messages is such that it fits in one so-called ATM cell, thus providing a flexible and simple way of exchanging the necessary messages.

It should furthermore be noted that the above restoration procedure also applies in the special case where a switching node has links to only two other switching nodes and both these links fail. In that case a similar situation as for the node failure described above occurs.

When after a predetermined time period the data streams are not fully rerouted, a centralised or back-up algorithm is started which includes an information collection first phase and a calculation second phase.

The information collection phase consists in broadcasting from a so-called restoration controller node trigger messages. This restoration controller node is chosen to be the one of the above failure detecting nodes with the smallest address, i.e. the above chooser node. To be noted that another criterion may be used here so that the restoration controller node may be different from the chooser node.

It should also be noted that, when this centralised algorithm is applied not after the above described distributed algorithm but as a stand-alone algorithm, the restoration controller node may be chosen by firstly transmitting, by each switching node detecting a failure, control messages having a control field for including the address of the restoration controller node. This control field first contains the address of the switching node which has detected the failure and thereupon transmits the control message. In each switching node in which the control message is subsequently received the control field is adapted so that it now includes the smallest of the received contents of the control field and the address of the respective switching node or according to any other predetermined rule, and the control message is thereupon retransmitted. The control message also includes a hop count field whereby the area of switching nodes from which the restoration controller node is chosen is restricted.

The trigger message has the following form:

| TRIG | CTN | HOPCT | VP |

Herein:
  TRIG indicates that the message is a trigger message;
  CTN is a controller field containing the address of the restoration controller node;
  HOPCT is a hop count field containing a hop count value which for each rebroadcasting of the trigger message is incremented with one; and
  VP is a field containing the identities of the virtual paths or data streams still to be restored and their associated bandwidths.

When each switching node includes a storage means in which an identity of the link on which the trigger message was received, together with its signature, is stored, then the controller field CTN may be omitted from the trigger message as its purpose is mainly to be able to retrace a path towards the restoration controller node.

When the trigger message is received in a switching node, the hop count value contained in the hop count field HOPCT is compared to a predetermined maximum hop count value stored in each switching node. When the received hop count value is equal to (or larger than) the predetermined maximum hop count value, the trigger message is not further transmitted whereby the predetermined maximum hop count value indicates a restricted area of switching nodes from which information is collected.

Each switching node receiving such a trigger message thereupon transmits an information message to the restoration controller node with information concerning the bandwidth available on the links connected to it. This information message has the following form:

| INF | SIG | CTN | BW—L;... | BOUND |
|---|---|---|---|---|

Herein:

INF indicates that the message is an information message;

SIG is a signature of the information message allowing to distinguish between different information messages transmitted in the switching network;

CTN is a field containing the address of the restoration controller node which may be omitted when in each switching node an identity of the link on which a trigger message with the same signature was received, is stored as described above:

BW-L; ... is a field containing information as to the available bandwidth on links connected to the switching node from which the information message originates and the identity of the link on which this bandwidth is available; when a path is terminated in the latter switching node, this is also indicated in this field; and BOUND is a field whose contents indicate whether the information message originates from a boundary node or not, whereby the restoration controller node is informed of the fact that no information messages have to be expected from further neighbouring nodes of this boundary node, and whose contents also indicate which of the virtual paths mentioned in the received trigger message are routed through this boundary node whereby the restoration controller node knows which virtual paths end where on the borders of the restricted area so that it may calculate alternative routes between these border points.

This information message is transmitted to the restoration controller node either by routing it on the basis of the information contained in its field CTN, or by transmitting it in each switching node on the link on which the respective trigger message was received as is indicated in the mentioned storage means.

Thus, finally all information concerning the available bandwidth in the area of switching nodes restricted due to the predetermined maximum hop count value is collected in the restoration controller node. Then, the calculation phase of the centralised algorithm is started. Such an algorithm may be based on the construction of a matrix of available bandwidths in the restricted area from which the alternative route (or routes) may be derived either analytically or heuristically.

It should be noted that when in the information message the addresses of all neighbouring nodes of the information message transmitting node are included, the restoration controller node may implicitly know when all information messages have been received since it may then calculate whether these neighbouring nodes still fall inside or already outside the restricted area and check, in the former case, whether an information message has already been received from the respective neighbouring node.

Once an alternative route has been found, the data stream may be reallocated thereto and transmitted thereon.

It should be noted that when still no alternative route has been found, the centralised algorithm may be restarted with a larger value for the maximum hop count.

While the principles of the invention have been described above in connection with specific apparatus, it is to be clearly understood that this description is made only by way of example and not as a limitation on the scope of the invention.

What is claimed is:

1. A method for rerouting, upon failure of a route, a data stream previously routed via said route through a switching network which includes a plurality of switching nodes (SN1..SN9) with respective addresses (1..9) and interconnected by respective links (L12..L89) used for setting up routes, and said method including the steps of:

detecting said failure of said route on one of said links (L19) between first (SN1) and second (SN9) said switching nodes in at least said first switching node (SN1);

transmitting from said first switching node (SN1) and on each but said one of said links connected to it, a request message (REQ) having first (IDA) and second (IDB) address fields containing addresses of said first (1) and second (9) switching nodes, respectively;

in each of said switching nodes having received said request message (REQ) on a link, retransmitting said request message (REQ) on each link connected to it but said link on which said request message (REQ) was received, until an alternative route for said data stream is found between two end switching nodes of said alternative route;

allocating said data stream to said alternative route and transmitting it thereon, characterized in that said allocation step is performed by a said end switching node (SN1) chosen amongst said two end switching nodes according to a predetermined rule, the choice being made after said alternative route has been found.

2. A method according to claim 1, characterized in that said predetermined rule is based on the addresses (1,9) of said end switching nodes.

3. A method according to claim 1, characterized in that, when said request message (REQ) is received in an intermediate one (SN3) of said switching nodes which already received a further request message whose first and second address fields include the addresses of said second (9) and first (1) switching nodes, respectively, said alternative route is found between said first (SN1) and second (SN9) switching nodes, said intermediate switching node (SN3) choosing said switching node (SN1) performing said allocation.

4. A method according to claim 1, characterized in that, when said request message (REQ) is received in said second switching node (SN9), said alternative route is found between said first (SN1) and second (SN9) switching nodes, said second switching node (SN9) thereupon choosing said switching node (SN1) performing said allocation.

5. A method according to claim 1, characterized in that, when said request message (REQ) is received in an intermediate one (SN7) of said switching nodes which already received a request message originating from a third switching node (SN8) and whose second address field includes the address (6) of said second switching node (SN6), said alternative route is found between said first (SN5) and third (SN8) switching nodes, said intermediate switching node (SN7) choosing said switching node (SN5) performing said allocation.

6. A method according to claim 5, characterized in that said switching node (SN3) choosing the switching node (SN1) performing said allocation, upon having made said choice, transmits to said end switching node (SN1) chosen to perform said allocation a confirmation message (CNF).

7. A method according to claim 6, characterized in that said switching node (SN1) chosen to perform said allocation, upon receipt of said confirmation message (CNF), transmits a connection message (CON) to the other end switching node (SN9) indicating thereto said allocation of said data stream to said alternative route.

8. A method according to claim 7, characterized in that, when a said switching node on said alternative route between said switching node choosing said switching node performing said allocation and said second end switching node not chosen to perform said allocation receives a said connection message (CON), said switching node transmits a RELREQOUT release message (RELREQOUT) on each link connected to said switching node whereon superfluous bandwidth is reserved previously.

9. A method according to claim 8, characterized in that, when a said RELREQOUT release message (RELREQOUT) is received in said switching node choosing said switching node performing said allocation, a RELCONFIN release message (RELCONFIN) is transmitted by said switching node choosing said switching node performing said allocation to indicate that a confirmation message (CNF) previously transmitted therefrom should be cancelled or that the bandwidth specified therein should be reduced.

10. A method according to claim 6, characterized in that said confirmation message (CNF) includes a bandwidth field with the bandwidth allocated to said alternative route.

11. A method according to claim 6, characterized in that, when a said switching node receives a said confirmation message (CNF), said switching node transmits a RELREQOUT release message (RELREQOUT) on each link connected to said switching node whereon superfluous bandwidth is reserved previously.

12. A method according to claim 6, characterized in that, when a said switching node receives a said confirmation message (CNF) wherein superfluous bandwidth is allocated to said alternative route, a RELCONFOUT release message (RELCONFOUT) is transmitted on said link whereon said confirmation message (CNF) is received.

13. A method according to claim 1, characterized in that said request message (REQ) includes bandwidth fields (BWAB, BWBA) with the bandwidth requested on the link on which it is transmitted from and to the switching node transmitting it, and that upon receipt of said request message (REQ) in the latter switching node, said requested bandwidth is reserved therein.

14. A method according to claim 13, characterized in that, when said requested bandwidth is larger than the sum of bandwidths available to and from said latter switching node on all links connected to said latter switching node but said link on which said request message (REQ) is received, said latter switching node stores an excess request message in a hold buffer provided thereto in said latter switching node, said excess request message indicating that an excess bandwidth requested in said received request message (REQ) is not yet requested in transmitted request messages.

15. A method according to claim 14, characterized in that said excess request message includes bandwidth fields with said excess bandwidth from and to said latter switching node respectively and further includes a signature field with a signature of said received request message (REQ).

16. A method according to claim 14, characterized in that, when later on bandwidth on a link connected to said latter switching node which is different from said link whereon said request message (REQ) is received becomes available, a request message is transmitted on said link whereon said bandwidth becomes available, wherein the bandwidth requested equals the minimum of said excess bandwidth and said bandwidth that becomes available, and said excess request message is modified in such a way that it indicates remaining not yet requested bandwidth.

17. A method according to claim 16, characterized in that, when said minimum equals said excess bandwidth, said excess request message is erased from said hold buffer.

18. A method according to claim 13, characterized in that said request message (REQ) includes an overrequest field (OVERRQ) which when the sum of the bandwidths requested for a same alternative route in request messages transmitted by a said switching node is larger than the bandwidth requested by a request message for said same alternative route received by the latter switching node, includes the latter received requested bandwidth.

19. A method according to claim 13, characterized in that, when said requested bandwidth is larger than the sum of bandwidths available to and from said latter switching node on all links connected to said latter switching node but said link on which said request message (REQ) is received, and when there is no chance that later on bandwidth becomes available on a link connected to said latter switching node which is different from said link whereon said request message (REQ) is received, said latter switching node transmits a RELREQIN release message (RELREQIN) on said link whereon said request message (REQ) is received to indicate that bandwidth reserved thereon should be released.

20. A method according to claim 1, characterized in that said request message (REQ) includes a hop count value which upon each rebroadcasting thereof is increased by one.

21. A method according to claim 1, characterized in that, when said request message (REQ) is received in an intermediate one of said switching nodes which already transmitted on said link whereon said request message (REQ) is received in said intermediate switching node, a further request message whose first and second address fields include the addresses of said second and first switching nodes respectively, said alternative route is found between said first and second switching nodes, either said intermediate node or said node where said request message (REQ) is received from being designated confirmation node, said confirmation node transmitting a confirmation message to said end switching node chosen to perform said allocation and the one of said intermediate node and said node where said request message is received from which is not said confirmation node transmitting a RELNACK release message (RELNACK) on said link whereon said request message (REQ) and said further request message are transmitted to either cancel said request message (REQ) or said further request message depending on the choice of said confirmation node.

22. A method according to claim 1, characterized in that, whenever available bandwidth is requested in two said request messages transmitted in opposite directions on a said ink by two of said switching nodes connected thereto, one of said switching nodes is designated master node whilst the other is designated slave node, said available bandwidth being assigned to said request message transmitted by said master node and said request message transmitted by said slave node being cancelled by a RELNACK release message (RELNACK).

23. A method according to claim 1, characterized in that said switching network is a cell switching network, said data stream being a cell stream, and that said request, confirmation and connection messages are each confined to one cell transmitted through said cell switching network.

24. A method according to claim 1, characterized in that said switching network operates according to the asynchronous transfer mode (ATM) protocol.

25. A method according to claim 1, characterized in that said switching network operates according to the synchronous digital hierarchy (SDH) protocol.

26. A method for rerouting upon failure of a route, a data stream previously routed via said route through a switching network which includes a plurality of switching nodes (SN1..SN9) with respective addresses (1..9) and interconnected by respective links (L12..L89) used for setting up routes, said method including the steps of:

broadcasting trigger messages in a controller node;

in each of said switching nodes having received a said trigger message on a receipt link, transmitting to said controller node an information message containing the amounts of bandwidth available on the links connected to it, and rebroadcasting said trigger message on each link connected to it but said link on which said trigger message was received;

in said controller node, calculating from said received amounts of bandwidth an alternative route for said data stream and thereupon allocating said route to said data stream;

transmitting said data stream on said alternative route, characterized in that a said switching node having detected said failure is, according to a predetermined rule, chosen as said controller node.

27. A method according to claim 26, characterized in that it includes the additional steps of:

in a said switching node having detected said failure, transmitting control messages having a control field for containing the address of said controller node and which is initialized with the address of said detecting switching node;

in each switching node receiving a said control message, transmitting an adapted said control message whose control field is adapted according to a predetermined rule.

28. A method according to claim 27, characterized in that said predetermined rule is based on the contents of the control field of said received control message and the address of said switching node in which it is received.

29. A method according to claim 26, characterized in that said trigger message includes a hop count value which upon each rebroadcasting thereof is increased by one.

30. A method according to claim 26, characterized in that said trigger message includes a controller field including the address of said controller node.

31. A method according to claim 26, characterized in that each said switching node receiving a said trigger message stores an identity of said link on which said trigger message was received in a storage means thereof.

32. A method according to claim 26, characterized in that said information message also contains information as to which paths are terminated in the switching node from which it originates.

33. A method according to claim 1, characterized in that it is used for rerouting a plurality of data streams, and that when not all data streams have been restored after a predetermined time has elapsed, then a method for rerouting the data streams which have not been restored includes the steps of:

broadcasting trigger messages in a controller node;

in each of said switching nodes having received a said trigger message on a receipt link, transmitting to said controller node an information message containing the amounts of bandwidth available on the links connected to it, and rebroadcasting said trigger message on each link connected to it but said link on which said trigger message was received;

in said controller node, calculating from said received amounts of bandwidth an alternative route for said data stream and thereupon allocating said route to said data stream;

transmitting said data stream on said alternative route, characterized in that a said switching node having detected said failure is, according to a predetermined rule, chosen as said controller node;

whereby the rest of said data streams are restored.

* * * * *

UNITED STATES PATENT AND TRADEMARK OFFICE
CERTIFICATE OF CORRECTION

PATENT NO. : 5,590,118
DATED : December 31, 1996
INVENTOR(S) : Leo Nederlof

It is certified that error appears in the above-indentified patent and that said Letters Patent is hereby corrected as shown below:

Column 24, line 55 (Claim 22, line 4), "ink" should be --link--.

Signed and Sealed this

Tenth Day of June, 1997

Attest:

BRUCE LEHMAN

Attesting Officer

Commissioner of Patents and Trademarks